United States Patent
Fulks et al.

(10) Patent No.: US 6,324,845 B1
(45) Date of Patent: Dec. 4, 2001

(54) SELF CONTAINED, SUPPLEMENTAL VACUUM ASSIST UNIT FOR VEHICLE BRAKE BOOSTER

(75) Inventors: Gary Chris Fulks; Douglas E. Poole, both of Dayton; James William Zehnder, II, Huber Heights; Timothy Allen Haerr, Enon; Timothy M. Schlangen, Dayton; Vivek V. Mohile, Beavercreek, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/602,783

(22) Filed: Jun. 23, 2000

(51) Int. Cl.$^7$ ................................. B60T 11/32
(52) U.S. Cl. ..................... 60/582; 60/397; 91/1
(58) Field of Search ............... 60/397, 405, 326, 60/582; 91/1

(56) References Cited

U.S. PATENT DOCUMENTS

| | | | |
|---|---|---|---|
| 3,094,843 | * 6/1963 | Martin | 60/582 |
| 4,043,123 | * 8/1977 | Konishi et al. | 60/397 |
| 4,328,669 | 5/1982 | Mort. | |
| 4,332,302 | 6/1982 | Kosmanski. | |
| 4,358,928 | 11/1982 | Kotwicki. | |
| 4,730,999 | * 3/1988 | Tsakuda et al. | 60/397 |
| 4,738,112 | * 4/1988 | Nomura et al. | 60/397 |
| 4,790,937 | 12/1988 | Eilers. | |
| 4,897,184 | 1/1990 | Shouldice et al.. | |
| 5,024,294 | 6/1991 | Van Fossen et al.. | |
| 5,219,041 | 6/1993 | Greeve. | |
| 5,717,135 | 2/1998 | Fiorletta et al.. | |
| 5,881,557 | * 3/1999 | Shields | 60/397 |
| 6,164,183 | * 12/2000 | Fulks et al. | 91/367 |
| 6,255,941 | * 7/2001 | Osterman et al. | 340/479 |

FOREIGN PATENT DOCUMENTS 57-164854 * 9/1982 (JP) ........................... 60/397

* cited by examiner

Primary Examiner—Edward K. Look
Assistant Examiner—Igor Kershteyn
(74) Attorney, Agent, or Firm—Robert M. Sigler (57) ABSTRACT

A self contained, supplemental vacuum assist unit is provided for use with a vacuum brake booster and a source of vacuum in a motor vehicle. The unit includes, within a single housing, an electric motor, an air pump driven by the motor, a manifold defining air exhaust and assist vacuum chambers, a pair of check valves permitting air flow from the pump outlet and the assist vacuum chamber to the air exhaust chamber, an outlet from the air exhaust chamber with a fitting for connection to the vacuum source, an opening from the assist vacuum chamber with a fitting providing communication directly to the interior of the vacuum chamber of the booster, and a pressure sensor including a diaphragm, plunger, magnet with a Hall effect sensor and motor control circuitry on a circuit board within the assist vacuum chamber. The unit is compact, light weight and efficient and is designed for attachment directly to the booster with no intervening vacuum hose therebetween.

19 Claims, 6 Drawing Sheets

SELF CONTAINED, SUPPLEMENTAL VACUUM ASSIST UNIT FOR VEHICLE BRAKE BOOSTER

RELATED APPLICATIONS

This application is related to U.S. Ser. No. 09/374,664, filed Aug. 16, 1999 and assigned to the same assignee as this application. The relevant portion of the referenced application is incorporated by reference herein.

TECHNICAL FIELD

The technical field of this invention is vacuum brake booster apparatus for motor vehicles.

BACKGROUND OF THE INVENTION

Power brake assist using differential pressure actuated brake boosters is standard in the motor vehicle industry. These brake boosters typically have a diaphragm separating a vacuum chamber always open to a source of vacuum, such as created in an engine intake passage, and a working chamber normally provided with vacuum but controlled by valve apparatus responsive to input brake pedal actuation to allow atmospheric air therein and thus provide brake force assist through a differential pressure across the diaphragm. In some systems, it is also known to provide a vacuum pump, either in place of the engine vacuum source or as a backup therefor, to provide a normal supplied vacuum.

The braking assist force provided by such known vacuum brake boosters is only an assist force, which is added to the force provided by the vehicle operator through the brake pedal. The vehicle operator applied force is itself transmitted directly through the booster apparatus and applied to the master cylinder, whether or not the assist braking force is generated by the vacuum brake booster. Thus, vehicles provided with such vacuum brake boosters may be stopped even in the unlikely occurrence of loss of vacuum, producing reduced or non-existent braking assist force, although reduced braking force can result in longer stopping distance. Braking systems are designed for safe stopping within specified distances at predetermined vehicle speeds, even with no braking assist; but this task is difficult for heavier vehicles, and a source of back-up vacuum is desired in some cases to ensure that such vacuum based braking assist force is not lost. The object of this invention is to provide a self-contained, compact, light-weight, backup vacuum assist apparatus, and particularly such apparatus that is capable of mounting directly to a vacuum brake booster without necessity of additional vacuum hoses and with minimal additional external electrical wiring requirements. Such apparatus is capable of helping large, heavy vehicles to meet the standards of FMVSS 135.

SUMMARY OF THE INVENTION

A self contained, supplemental vacuum assist unit is provided for use with a vacuum brake booster and a source of vacuum in a motor vehicle, wherein the vacuum brake booster has a vacuum chamber and a working pressure chamber. The unit has a housing defining an assist vacuum chamber having an opening with a fitting adapted for connection to the vacuum chamber of the vacuum brake booster and further defining an air exhaust chamber having an opening with a fitting adapted for connection to the source of vacuum. The assist vacuum chamber and the air exhaust chamber are separated by a wall having a first opening with a first unidirectional flow valve permitting air flow only from the assist vacuum chamber to the air exhaust chamber. An electric motor driven air pump is further provided in the housing with an inlet from the assist vacuum chamber and an outlet to the air exhaust chamber. The air pump is associated with a second unidirectional flow valve permitting air flow through the air pump only from the assist vacuum chamber to the air exhaust chamber. An electric circuit board is provided within the assist vacuum chamber and has a Hall effect sensor thereon to sense a magnetic field of a magnet adjacent the sensor and further has a control circuit thereon responsive to the Hall effect sensor to control operation of the electric motor driven air pump. The housing also has an opening from the assist vacuum chamber to a source of air at atmospheric pressure, the opening being closed by a flexible diaphragm. A plunger is activated by the diaphragm for axial movement therewith in response to changes in pressure thereacross; and a permanent magnet is affixed to the plunger adjacent the Hall effect sensor. The permanent magnet generates a magnetic field sensed by the Hall effect sensor, and the Hall effect sensor is responsive thereto to generate a signal changing with the position of the permanent magnet and thus of the pressure across the diaphragm.

The unit is self-contained, with the motor, pump, fluid flow passages, check valves, pressure sensor and electronics all within the housing for compact packaging within a crowded vehicle engine compartment, light weight for minimal fuel penalty, and protection of the parts from environmental dirt and humidity. In the unit, the pressure sensor incorporates a Hall effect sensor for significant cost savings and mounts the Hall effect sensor on a circuit board within the assist vacuum chamber, together with the diaphragm activated plunger and magnet, for maximum protection and convenience of design. In a preferred embodiment, the magnet is axially adjustable with respect to the plunger and adjusted in calibration for minimal temperature variation of motor pump motor switching point. In a preferred embodiment, the plunger is guided by the circuit board to maintain a specified normal distance from the Hall effect sensor in axial motion. In a preferred embodiment, separate adjustment may be made for preferred spring bias on the plunger. In a preferred embodiment, the unit is provided with a fitting for direct connection to the vacuum chamber of the booster to eliminate a connecting hose therebetween. In a preferred embodiment, the unidirectional valve associated with the air pump acts on the air outlet of the pump to create a pressure drop that increases pump efficiency. In a preferred embodiment, in which the unit is attached directly to the booster, the unit is provided with two levels of sound isolation from the booster, with isolated mounting of the motor within the housing and isolation pads on the booster attachment brackets.

BRIEF DESCRIPTION OF THE DRAWINGS

FIG, 10 is a graph showing output voltage as a function of magnet position at the temperature independent axis of the Hall effect sensor at various temperatures for the sensor of FIG. 9.

DESCRIPTION OF THE PREFERRED EMBODIMENT

Figure 1:
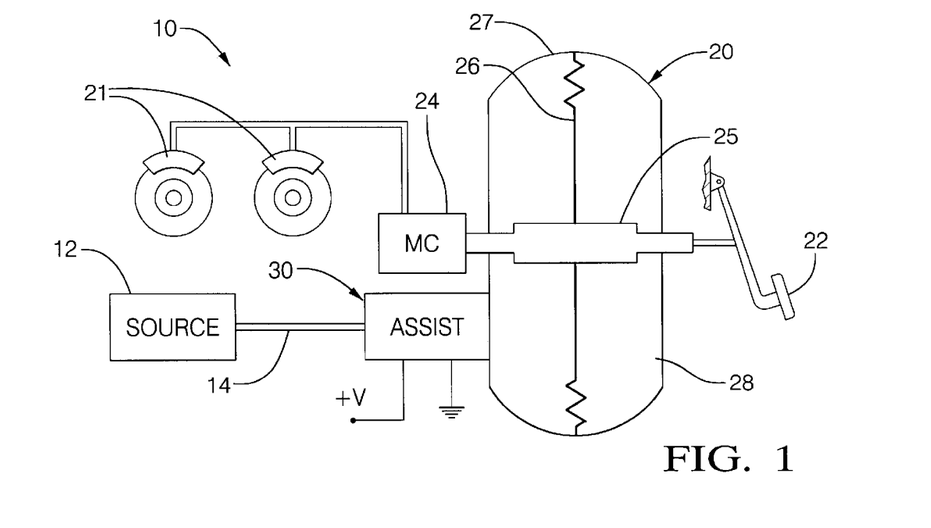
FIG. 1 is a schematic diagram of a vehicle brake system including a self-contained, supplemental vacuum assist unit according to the invention.

Referring to FIG. 1, a motor vehicle, generally indicated as 10, includes a primary source of vacuum 12, which is typically an air induction passage of a vehicle engine but could alternatively be a motor driven vacuum pump. A vehicle power brake system includes a brake booster 20 that receives an input brake activation force from a brake pedal 22 and communicates the activation force to a master cylinder 24, and thus to one or more vehicle brake units 21, through a valve and power piston apparatus 25 of known construction in the normal manner. A portion of the body of booster 20 is divided by a diaphragm 26 into a vacuum chamber 27 and a working chamber 28 to create a differential pressure actuator. Vacuum chamber 27 is connected to vacuum source 12 through a conduit 14 and vacuum assist unit 30. Unit 30 contains an electric motor driven pump and check valve apparatus, to be described below, to ensure a vacuum supply for vacuum chamber 27; and a substantially constant vacuum level, relative to atmospheric pressure, is maintained in vacuum chamber 27, normally by vacuum source 12 but, if required, by assist unit 30. Working chamber 28 is controlled by a multiple valve apparatus, not shown, to normally maintain the supplied vacuum when brake pedal 22 is not activated but to admit atmospheric air in response to activation of brake pedal 22 so as to provide pressure on diaphragm 26 to the left in FIG. 1. This pressure is communicated by diaphragm 26, through apparatus not shown, as an output brake assist force to master cylinder 24. The parts of brake booster 20 not shown, are standard in construction and operation, the details of which are well known in the art and unimportant to this invention. Examples may be found in U.S. Pat. No. 3,249,021 to Wuellner and U.S. Pat. No. 4,069,742 to Gephart et al, as well as many others.

Figure 3:
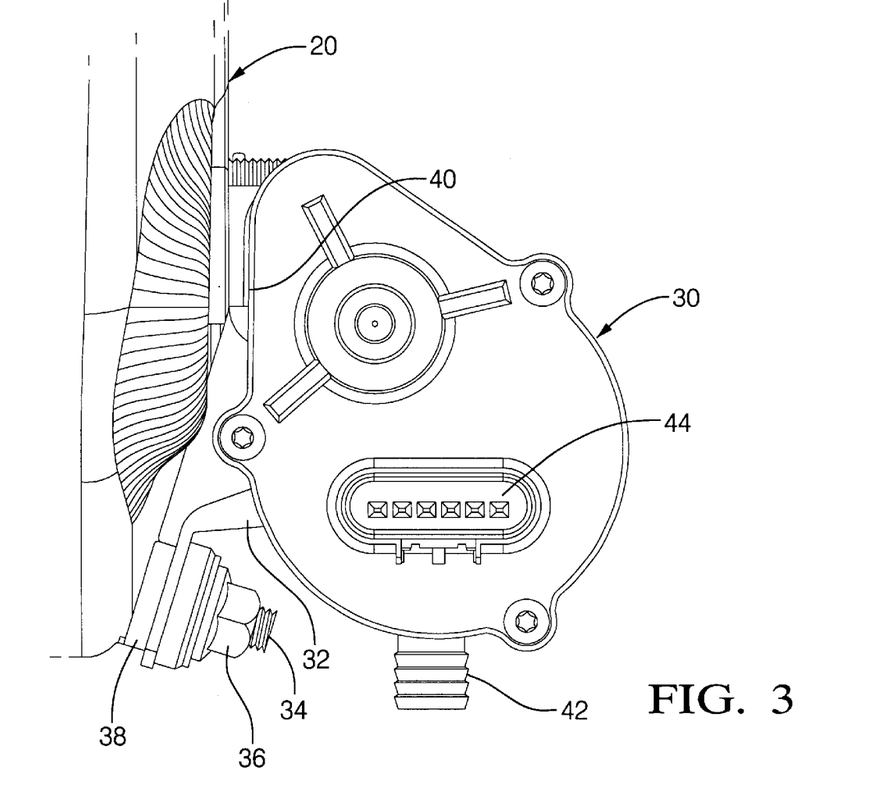
FIG. 3 is an elevation view of a preferred embodiment of a self-contained, supplemental vacuum assist unit according to this invention mounted on a brake booster.

Vacuum assist unit 30 is shown in its preferred position, attached directly to booster 20, in FIG. 3. The unit is attached by means of one or more mounting brackets 32 assembled on threaded studs 34 and held tightly thereon with nuts 36. Rubber isolators 38 may be used between brackets 32 and the body of unit 30 to reduce the transmission of motor and pump noise from unit 30 to booster 20. Studs 34 may be welded directly to the case of booster 20; and two such studs will provide sufficient support, with a third support point provided for a fitting 40 providing fluid communication from unit 30 directly into booster 20 without the need for a vacuum hose therebetween. Another fitting 42 accepts conduit 14 and communicates unit 30 to vacuum source 12. An electrical connector 44 is provided for connection of electrical devices and circuits within unit 30 to a vehicle wiring harness.

Figure 2:
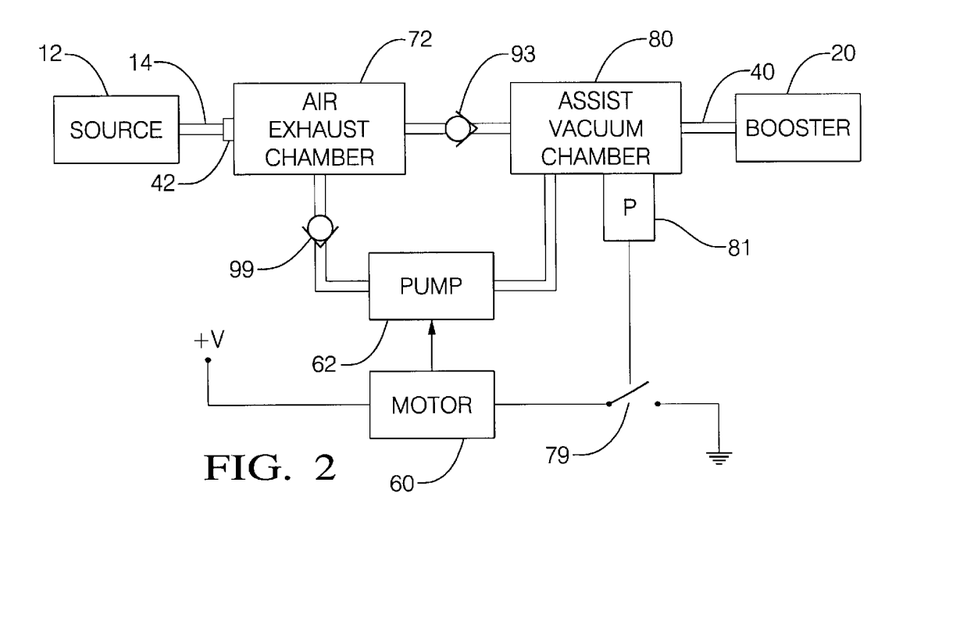
FIG. 2 is a schematic diagram of the vacuum supply system of the vehicle brake system of FIG. 1.

FIG. 2 shows a schematic diagram of unit 30 and its vacuum connections to source 12 and booster 20. Booster 20 is connected through fitting 40 of unit 30 to a vacuum assist chamber 80, which includes an integral pressure sensor 81 for vacuum within the chamber relative to atmosphere. Vacuum assist chamber 80 is connected via a check valve 93 to an air exhaust chamber 70 so that air flows only from chamber 80 to chamber 70. Chamber 70 is connected via fitting 42 of unit 30 and conduit 14 to vacuum source 12. Vacuum assist chamber 80 is also connected to the air inlet of a pump 62; and the air outlet of pump 62 is connected via a check valve 99 to air exhaust chamber 70. Pump 62 may thus pump air only from chamber 80 to chamber 70. Motor 60 is electrically connected in series with a switch 79 across a voltage +V and mechanically drives pump 62 when the switch is activated to a closed position. Switch 79 is responsive to sensor 81 to close when the sensed vacuum within assist chamber 80, and thus within vacuum chamber 27 of booster 20, falls below a predetermined minimum desired level. Switch 79 is preferably a semiconductor switch in a circuit in a switch control circuit on circuit board 74, the circuit being responsive to the output of sensor 81 and most probably containing a programmed microprocessor.

Figure 4:
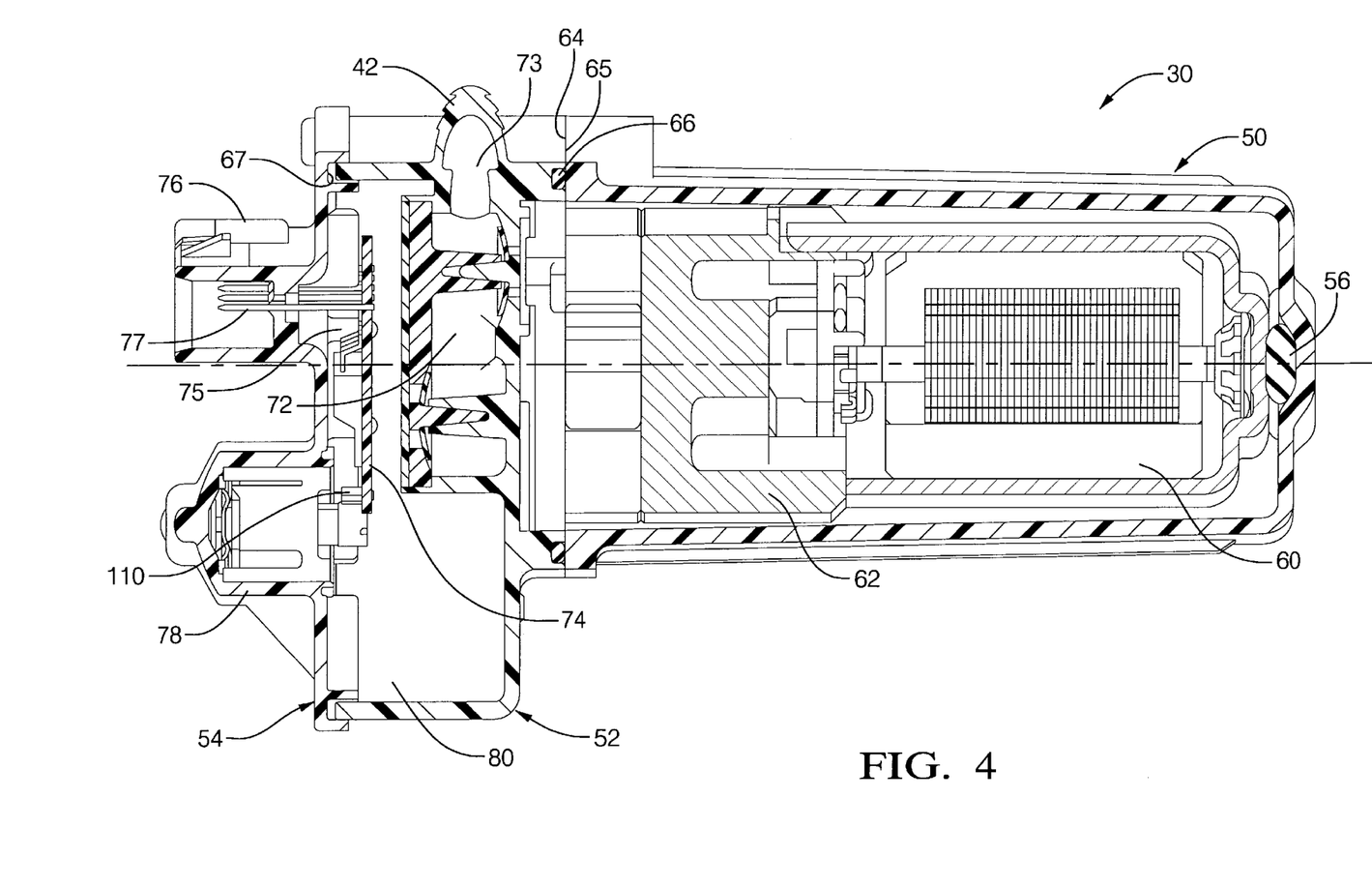
FIG. 4 is a longitudinal section view of the vacuum assist unit of FIG. 3.
Figure 7:
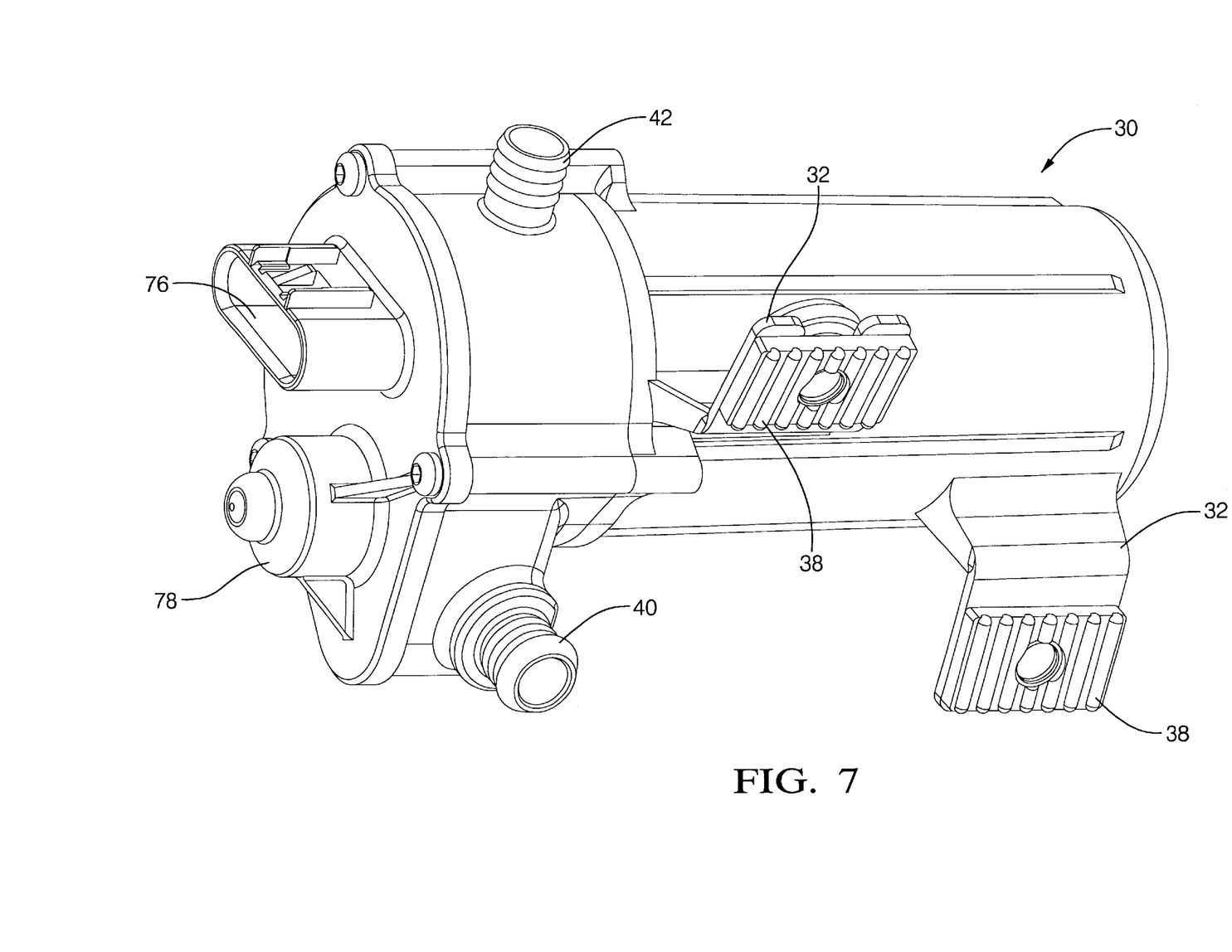
FIG. 7 is a perspective view of the vacuum assist unit of FIGS. 3–6.

Vacuum assist unit 30 is shown in cross section in FIG. 4 and in perspective in FIG. 7. A housing for unit 30 comprises three parts: a motor/pump housing 50, a manifold housing 52 and an end cap 54. Motor/pump housing 50, preferably made of aluminum or steel but possibly thermo-plastic, contains an electric motor 60 and an air pump 62, in this embodiment shown as a vane pump, adapted to be driven by motor 60. An open axial end 64 of motor/pump housing 50 is affixed to an axial side 65 of manifold housing 52, with an O-ring seal and isolation member 66. Member 66 slightly separates housings 50 and 52 for noise isolation of motor 60, which is supported at its opposite end in housing 50 by sound isolating member 56, typically made of rubber or a similar vibration absorbing material. End cap 54, made of a thermo-plastic material, is affixed to the opposite axial side 67 of manifold housing 52, in a connection that is also sealed. An internal divider member 70 internally affixed to manifold housing helps create a wall that divides the interior of manifold housing 52 and end cap 54 into an air exhaust chamber 72 and an assist vacuum chamber 80. Air exhaust chamber 72 is open through an opening 73 to fitting 42. End cap 54 includes a circuit board 74 affixed thereto on a plurality of studs 75 so as to be contained within chamber assist vacuum chamber 80. End cap further includes an integral connector fitting 76, through which project electrical connecting terminals 77 having one end connected to circuitry on circuit board 74 within chamber 80 and another end projecting out of unit 30 for connection to a vehicle wiring harness. End cap 54 further includes a pressure sensor housing portion 78 housing a differential pressure diaphragm and magnet tipped plunger for use with a Hall effect sensor 110 mounted on circuit board 74. The pressure sensing arrangement is described in greater detail with respect to FIG. 8.

Figure 5:
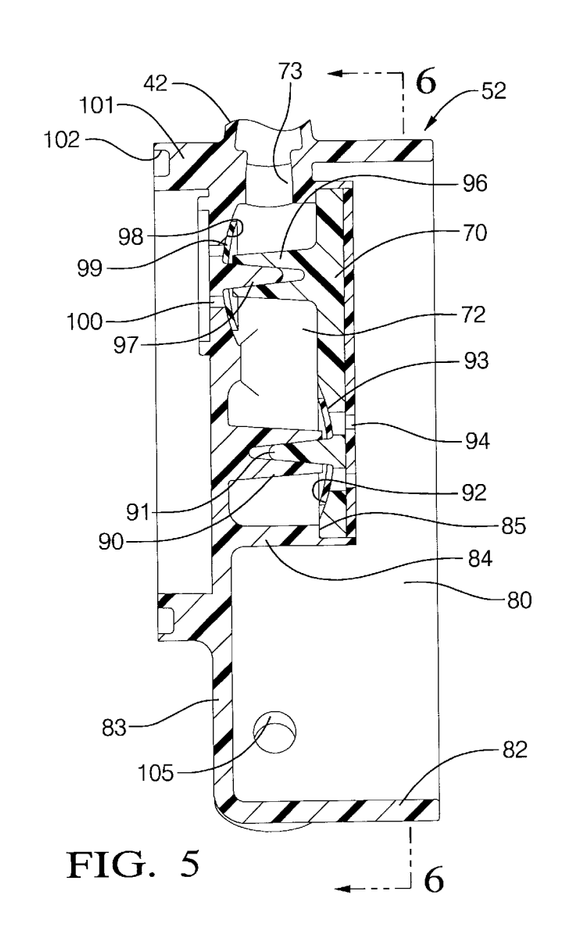
FIG. 5 is an enlarged section view, from the reverse direction, of a manifold housing of the vacuum assist unit of FIGS. 3 and 4.
Figure 6:
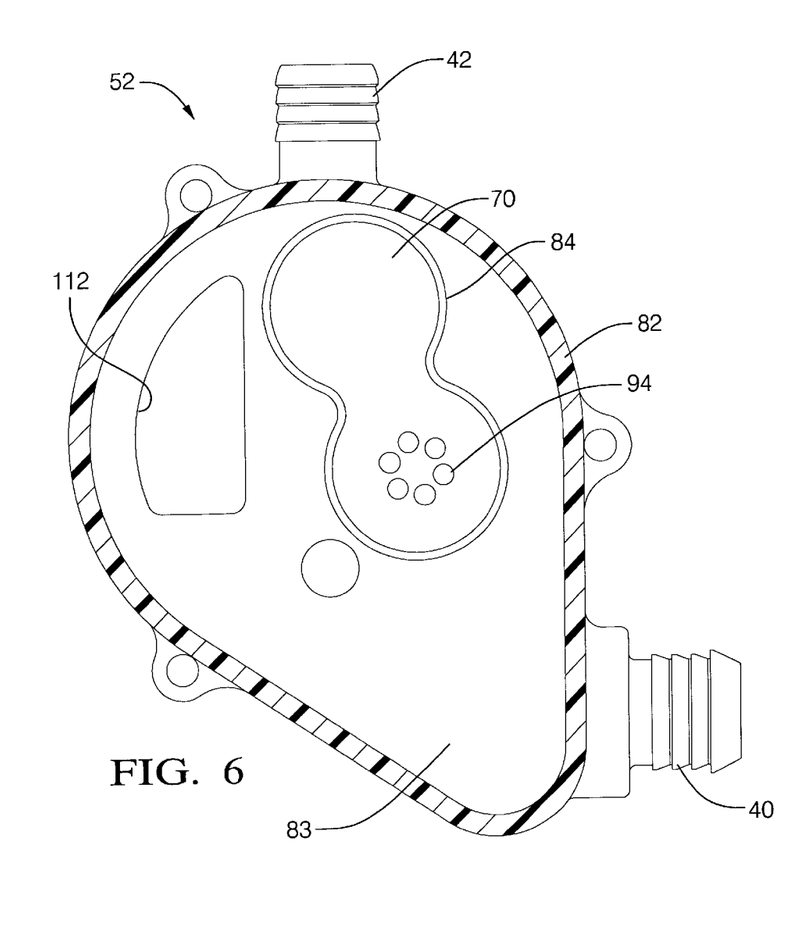
FIG. 6 is a section view along lines 6—6 in FIG. 5.

Manifold housing 52 is shown in an enlarged section viewed from the opposite side in FIG. 5 and, in a section normal to that of FIG. 5, in FIG. 6. Manifold housing 52, made of a thermo-plastic material, comprises a main, cup-shaped, outer portion 82 with a wall 83 at one axial end and open at the opposite axial end. Another wall 84 extends generally axially from wall 83 toward the open end and defines a receptacle 85 for internal divider member 70, which is fixed in a sealing manner therein to create air exhaust chamber 72. An axial projection 90 projects axially from wall 83 toward the open end of housing 52 to engage an axial projection 91 projecting in the opposite direction from divider member 70. A valve seat 92 is formed on the surface of divider member 70 surrounding projection 91;

and a movable valve element 93 is retained adjacent valve seat 92 to close one or more openings 94 when the pressure in air exhaust chamber 72 exceeds that in assist vacuum chamber 80. Opening 73 is provided from air exhaust chamber 72 to fitting 42, and thus through conduit 14 to vacuum source 12. Elements 90–94 define a check valve that automatically applies the vacuum of vacuum source 12 to assist vacuum chamber 80.

A similar arrangement, but on the opposite side of air exhaust chamber 72, provides engaging projections 96 from divider member 70 and 97 from wall 83, with a valve seat 98 in the surface of wall 83 surrounding projection 97 and a movable valve element 99 retained adjacent valve seat 98 to close one or more openings 100 through wall 83 when the pressure in air exhaust chamber exceeds that on the other side of wall 83. A short circular wall 101 projects from the side of wall 83 opposite air exhaust chamber 72 and is provided with a circular groove 102 to receive sealing O-ring 66. Openings 100 are sealingly connected to the air outlet of pump 62, with the air inlet of pump 62 being connected to assist vacuum chamber 80. Elements 96–100 thus define a check valve that automatically applies the vacuum created by pump 62 to assist vacuum chamber 80, which is thus maintained at the greater of the vacuum from vacuum source 12 and the vacuum created by pump 62. Assist vacuum chamber 80 is open through an opening 105 in outer portion 82 of manifold housing 52 and fitting 40 to vacuum chamber 27 of booster 20, which is thus also maintained at the same vacuum level. In addition, the placement of the check valve including element 99 in the outlet path of pump 62 provides a small pressure drop that improves pump efficiency and thus contributes to the compactness of unit 30.

Figure 8:
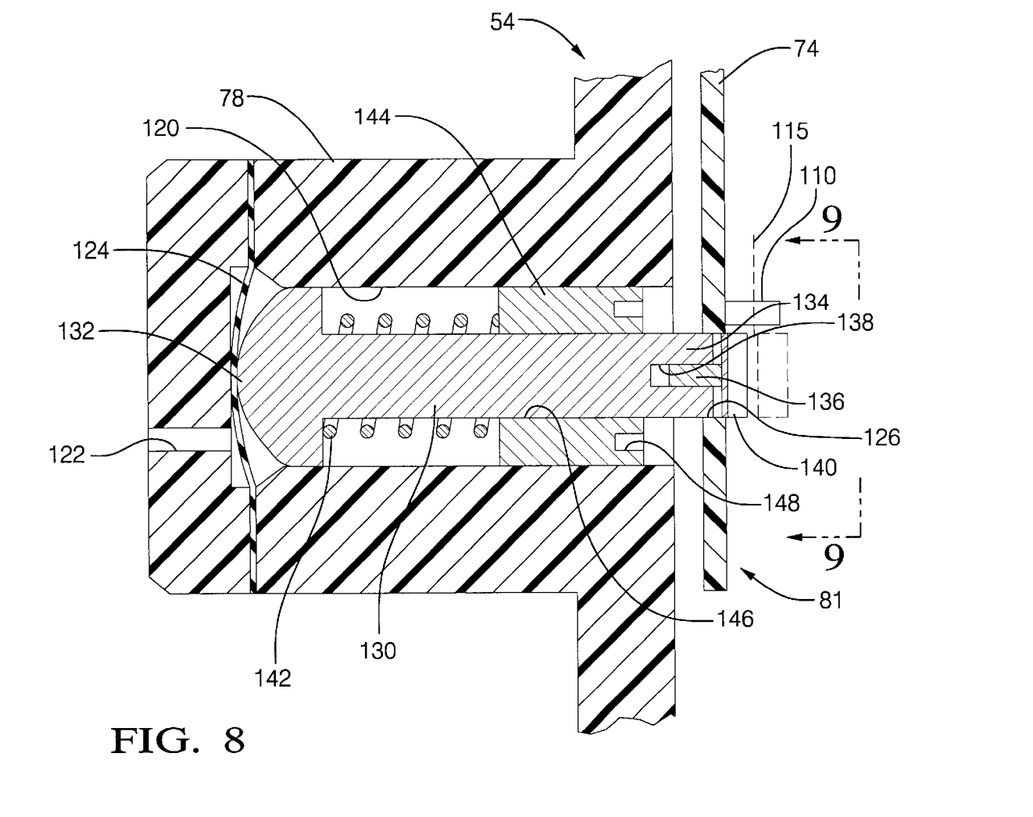
FIG. 8 is a section view of the pressure sensor apparatus in the vacuum assist unit of FIGS. 3–7.
Figure 9:
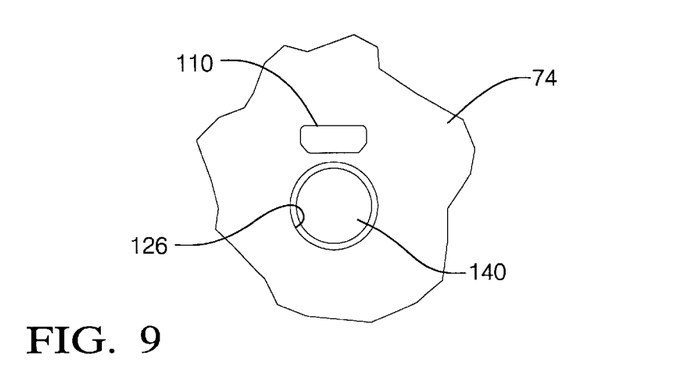
FIG. 9 is a view along lines 9—9 in FIG. 8.

The pressure sensor arrangement is shown in FIG. 8 and 9. A cylindrical recess 120 is provided in sensor fitting 78 of end cap 54. Recess 120 is open to assist vacuum chamber 80 at its inner end and, through an opening 122, to outside atmosphere at its opposite end. A flexible diaphragm 124 adjacent opening 122 prevents fluid communication between cylindrical recess 120 and the atmosphere and is subject to a differential pressure equal to the vacuum level, relative to atmosphere, in assist vacuum chamber 80. A plunger 130 is disposed in cylindrical recess 120 for axial movement therein. Plunger 130 has a diaphragm contacting head 132 at the end adjacent diaphragm 124 and an opposite axial end 134 projecting into vacuum assist chamber 80 and through a guide opening 126 in circuit board 74. Diaphragm 124 is preferably a rolling diaphragm so as to eliminate or reduce tension effects in the clamped portion of the diaphragm. A permanent magnet 140 is mounted on end 134 of plunger 130 in an axially adjustable manner, such as by mounting on a flat head screw 136 threadably inserted into an axial opening 138 on end 134 of plunger 130. Of course, plunger 130, screw 136 and other parts near magnet 140 are made of appropriate non-magnetic materials. Magnet 140 is magnetized axially, with north and south poles at opposing axial ends thereof. Plunger 130 is biased outwardly from chamber 80, into engagement with diaphragm 124, by a coil spring 142 reacting against a spring base member 144 which may be threadably adjustable within cylindrical recess 120 and has an opening 146 therethrough for plunger 130. Spring base member 144 may be positionally adjusted during assembly of unit 30 to provide a desired spring preload; and openings 148 may be provided for the insertion of a tool, before positioning of circuit board 74, to rotate spring base member 144 for such adjustment. The preload should be adjusted as sufficient to prevent movement of the plunger by forces other than a pressure differential across diaphragm 124 but low enough to allow response of the plunger to the minimum desired sensed pressure across diaphragm 124, as is known to those of skill in the art. The diaphragm 124, plunger head 132 and magnet 140 are shown in one extreme position in solid lines and, in another extreme position, in dashed lines.

Figure 10:
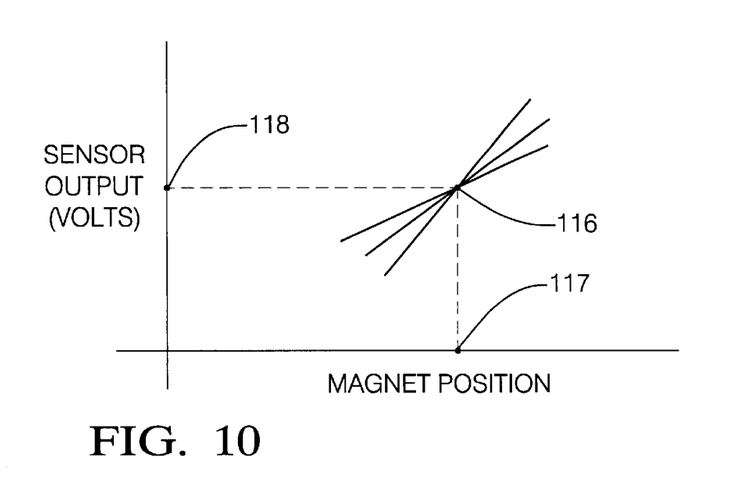

An important consideration of the pressure sensing system is its temperature sensitivity. The pressure sensing system is essentially be used as a switch, to activate motor 60 and thus drive pump 62 when sensed vacuum in assist vacuum chamber 80, which is essentially the same as that in vacuum chamber 27 of booster 20, falls below a predetermined level, in order to maintain that level as a minimum, even if there is a failure of vacuum source 12. Hall effect sensor 110 is a temperature sensitive element that produces a voltage output, for a given relative position of magnet 140. Thus, the output voltage of Hall effect sensor 110 will vary with temperature as well as with the axial position of magnet 140. However, Hall effect sensor 110 defines a particular position, which may be called the temperature invariant axis 115, at which the voltage is independent of temperature. In the graph of FIG. 10, which shows the relationship between magnet axial position and the output voltage of Hall effect sensor 110 at various temperatures, this temperature independent axis is represented by point 117 on the horizontal axis of the graph. In production, after the spring preload is set (if it is), the desired minimum supply vacuum is applied across the diaphragm; and screw 136 is turned to axially adjust the magnet until the until the desired temperature independent voltage is output. This voltage is essentially the mid-point output voltage of the Hall effect sensor, at which the sensed magnetic polarity reverses, and is represented by point 118 of the vertical axis of the graph. The two points define an operating point 116 through which several operating lines pass. The lines have slightly different slopes because they correspond to different operating temperatures; but they all pass through point 116. Once this calibration is made, the temperature offset is essentially removed; and a minimum desired supply vacuum will be more consistently provided, regardless of temperature.

FIG. 6 shows an opening 112 in wall 83 of manifold housing 52 that communicates assist vacuum chamber 80 with the interior of motor/pump housing 50, so that electrical connections, not shown, may be provided between motor 60 and circuit board 74 within chamber 80. Thus, all electrical apparatus in unit 30, including motor 60, sensor 81 and circuit board 74, are maintained in a vacuum environment, which is repeatedly and continuously pumped free of contaminants and corrosion causing moisture whenever the vehicle is being operated, whether the vacuum is provided by pump 62 or vacuum source 12.

What is claimed is:

1. A self contained, supplemental vacuum assist unit for use with a vacuum brake booster and a source of vacuum in a motor vehicle, the vacuum brake booster having a vacuum chamber and a working pressure chamber, the unit comprising, in combination:

a housing defining an assist vacuum chamber having an opening with a fitting adapted for connection to the vacuum chamber of the vacuum brake booster and further defining an air exhaust chamber having an opening with a fitting adapted for connection to the source of vacuum, the assist vacuum chamber and the air exhaust chamber being separated by a wall;

a first opening in the wall having a first unidirectional flow valve permitting air flow only from the assist vacuum chamber to the air exhaust chamber;

an electric motor driven air pump in the housing having an inlet from the assist vacuum chamber and an outlet to the air exhaust chamber, the pump having associated therewith a second unidirectional flow valve permitting air flow through the air pump only from the assist vacuum chamber to the air exhaust chamber;

an electric circuit board within the assist vacuum chamber having a Hall effect sensor thereon so as to sense a magnetic field of a magnet adjacent the sensor and a control circuit thereon responsive to the Hall effect sensor to control operation of the electric motor driven air pump;

the housing further defining an opening from the assist vacuum chamber to a source of air at atmospheric pressure, the opening being closed by a flexible diaphragm;

a plunger activated by the diaphragm for axial movement therewith due to changes in pressure across the diaphragm; and a permanent magnet affixed to the plunger adjacent the Hall effect sensor, the permanent magnet generating a magnetic field sensed by the Hall effect sensor and the Hall effect sensor being responsive thereto to generate a signal changing with the position of the permanent magnet and thus with the pressure across the diaphragm.

2. The self contained, supplemental vacuum assist unit of claim 1 in which the electric circuit board is adapted to guide the motion of the plunger in a predetermined direction relative to the Hall effect sensor.

3. The self contained, supplemental vacuum assist unit of claim 1 in which the permanent magnet is affixed on an end of the plunger in an axially adjustable manner.

4. The self contained, supplemental vacuum assist unit of claim 1 in which the permanent magnet is affixed on an end of the plunger in an axial position relative thereto to cross a temperature invariant axis of the Hall effect sensor at a predetermined pressure across the diaphragm corresponding to a minimum desired vacuum level in the vacuum chamber of the vacuum brake booster.

5. The self contained, supplemental vacuum assist unit of claim 3 in which the diaphragm and plunger are biased by a spring reacting against a spring seat member adjustable to vary the spring preload.

6. The self contained, supplemental vacuum assist unit of claim 1 in which one or more brackets are provided for mounting the unit directly on the vacuum booster and the fitting is adapted to directly communicate the assist vacuum chamber to the vacuum chamber of the booster, without the use of intervening, removable conduits between the unit and the booster, when the unit is so mounted.

7. The self contained, supplemental vacuum assist unit of claim 6 further having two levels of sound isolation apparatus between the electric motor in the unit and the booster: first sound isolating mounting devices associated with the brackets, and second sound isolating mounting devices between the electric motor and the housing of the unit.

8. The self contained, supplemental vacuum assist unit of claim 1 in which the second unidirectional valve is disposed downstream of the outlet of the air pump.

9. The self contained, supplemental vacuum assist unit of claim 1 in which the housing comprises a manifold housing with an end cap, the manifold housing having at least one interior wall dividing the manifold housing into the vacuum assist chamber and the air exhaust chamber, and the end cap completing the assist vacuum chamber, holding the diaphragm, plunger and magnet of the sensor, and supporting the circuit board and external electrical connection apparatus therefrom.

10. The self contained, supplemental vacuum assist unit of claim 9 in which the housing further comprises a motor/pump housing attached to the manifold housing and having an opening to the assist vacuum chamber through which electrical connection is provided therefrom to the motor, whereby the magnet, circuit board, Hall effect sensor and motor are all maintained within the vacuum supplied to the booster, regardless of the source of such vacuum.

11. Vehicle power brake assist apparatus for use with a source of vacuum in a motor vehicle, the apparatus comprising a vacuum brake booster and a supplemental vacuum assist unit, the vacuum brake booster having a vacuum chamber and a working pressure chamber, the supplemental vacuum assist unit being affixed to the vacuum brake booster by one or more brackets and comprising, in combination:

a housing defining an assist vacuum chamber having an opening with a fitting directly communicating with the vacuum chamber of the vacuum brake booster and further defining an air exhaust chamber having an opening with a fitting adapted for connection to the source of vacuum, the assist vacuum chamber and the air exhaust chamber being separated by a wall;

a first opening in the wall having a first unidirectional flow valve permitting air flow only from the assist vacuum chamber to the air exhaust chamber;

an electric motor driven air pump in the housing having an inlet from the assist vacuum chamber and an outlet to the air exhaust chamber, the pump having associated therewith a second unidirectional flow valve permitting air flow through the air pump only from the assist vacuum chamber to the air exhaust chamber;

an electric circuit board within the assist vacuum chamber having a Hall effect sensor thereon so as to sense a magnetic field of a magnet adjacent the sensor and a control circuit thereon responsive to the Hall effect sensor to control operation of the electric motor driven air pump;

the housing further defining an opening from the assist vacuum chamber to a source of air at atmospheric pressure, the opening being closed by a flexible diaphragm;

a plunger activated by the diaphragm for axial movement therewith due to changes in pressure across the diaphragm;

a permanent magnet affixed to the plunger adjacent the Hall effect sensor, the permanent magnet generating a magnetic field sensed by the Hall effect sensor and the Hall effect sensor being responsive thereto to generate a signal changing with the position of the permanent magnet and thus with the pressure across the diaphragm.

12. The vehicle power brake assist apparatus of claim 11 in which the electric circuit board is adapted to guide the motion of the plunger in a predetermined direction relative to the Hall effect sensor.

13. The vehicle power brake assist apparatus of claim 11 in which the permanent magnet is affixed on an end of the plunger in an axially adjustable manner.

14. The vehicle power brake assist apparatus of claim 11 in which the permanent magnet is affixed on an end of the plunger in an axial position relative thereto to cross a temperature invariant axis of the Hall effect sensor at a predetermined pressure across the diaphragm corresponding to a minimum desired vacuum level in the vacuum chamber of the vacuum brake booster.

15. The vehicle power brake assist apparatus of claim 13 in which the diaphragm and plunger are biased by a spring reacting against a spring seat member adjustable to vary the spring preload.

16. The vehicle power brake assist apparatus of claim 11 in which the second unidirectional valve is disposed downstream of the outlet of the air pump.

17. The vehicle power brake assist apparatus of claim 11 in which the housing comprises a manifold housing with an end cap, the manifold housing having at least one interior wall dividing the manifold housing into the vacuum assist chamber and the air exhaust chamber, and the end cap completing the assist vacuum chamber, holding the diaphragm, plunger and magnet of the sensor, and supporting the circuit board and external electrical connection apparatus therefrom.

18. The vehicle power brake assist apparatus of claim 17 in which the housing further comprises a motor/pump housing attached to the manifold housing and having an opening to the assist vacuum chamber through which electrical connection is provided therefrom to the motor, whereby the magnet, circuit board, Hall effect sensor and motor are all maintained within the vacuum supplied to the booster, regardless of the source of such vacuum.

19. The vehicle power brake assist apparatus of claim 11 further having two levels of sound isolation apparatus between the electric motor in the unit and the booster: first sound isolating mounting devices associated with the brackets, and second sound isolating mounting devices between the electric motor and housing of the unit.

* * * * *